United States Patent

Tutt

Patent Number: 5,995,132
Date of Patent: Nov. 30, 1999

[54] METHOD AND APPARATUS FOR PRINTING INTERDIGITATED IMAGES

[75] Inventor: Lee W. Tutt, Webster, N.Y.

[73] Assignee: Eastman Kodak Company, Rochester, N.Y.

[21] Appl. No.: 08/961,057

[22] Filed: Oct. 30, 1997

[51] Int. Cl.⁶ .............................. B41J 2/47; G03B 27/32
[52] U.S. Cl. ............................................. 347/261; 355/22
[58] Field of Search ................................... 347/134, 135, 347/241, 243, 256, 261, 248, 233; 355/22, 40; 348/59; 359/216, 217, 220, 463; 396/327, 330; 430/946; 458/296, 409, 481

[56] References Cited

U.S. PATENT DOCUMENTS

| 5,248,997 | 9/1993 | Summers | 347/261 |
| 5,305,022 | 4/1994 | Ota et al. | 347/233 |
| 5,349,419 | 9/1994 | Taguchi et al. | 355/22 |

FOREIGN PATENT DOCUMENTS

| 42-5473 | 3/1967 | Japan. |
| 48-6488 | 2/1973 | Japan. |
| 49-607 | 1/1974 | Japan. |
| 53-33847 | 9/1978 | Japan. |
| 59-3781 | 1/1984 | Japan. |

Primary Examiner—N. Le
Assistant Examiner—L. Anderson
Attorney, Agent, or Firm—Nelson Adrian Blish

[57] ABSTRACT

A method for printing interdigitated images comprising the steps of interdigitating f images by modulating b beams of light (12) with image information. The b beams of light (12) are scanned onto an image-forming medium (50) by a polygon scanner (30) which has p sides. The relationship between the number of images f, the beams of light b, and the number of sides of the polygon p is given by $f/pb = n$ where n is an integer. The image-forming medium is registered with a lenticular medium.

13 Claims, 3 Drawing Sheets

METHOD AND APPARATUS FOR PRINTING INTERDIGITATED IMAGES

FIELD OF THE INVENTION

The present invention relates in general to laser printing of stereoscopic images, multiple images, or motion images, and in particular to a method and apparatus for printing interdigitated images used in conjunction with a lenticular or a blocking line screen medium.

BACKGROUND OF THE INVENTION

Lenticular overlays are a known means to give images the appearance of depth. A lenticular image is created using a transparent upper layer having narrow, parallel lenticules (semi-cylindrical lenses) on an outer surface, and an image-containing substrate which projects images through the lenticules. The two layers form a lenticular system wherein different portions of an image are selectively visible as a function of the angle from which the system is viewed. If the image is a composite picture made by bringing together into a single composition a number of different parts of a scene photographed from different angles, and the lenticules are vertically oriented, each eye of a viewer will see different elements and the viewer will interpret the net result as depth of field. The viewer may also move his head with respect to the image thereby observing other views with each eye and enhancing the sense of depth.

Another method for showing images is the use of a blocking line screen positioned at a specific distance from the composite picture. This parallax process causes blocking of all images except one specific image. This allows the eyes to view different images as three-dimensional (3-D) images, or to achieve a simulation of motion, by the process of tipping the medium or movement of the head to a different angle with respect to the medium. Both of these processes, a lenticular image or a line blocking screen, can be used to generate a 3-D effect at a proper viewing distance, or simulated motion multiple images, by viewing the composite image from different angles.

When the lenticules or blocking line screen is oriented horizontally, each eye receives the same image. In this case, the multiple images give illusion of motion when the composite image is rotated about a line parallel to a line formed by the viewers eyes.

Whether the lenticules or the line blocking screen is oriented vertical or parallel, each of the viewed images are generated by lines of images which have been interlaced at the frequency of the lenticular or line blocking screen. Interlacing lines of each image is referred to as interdigitation. Interdigitation can be better understood by using an example four images used to form a composite with a material having three lenticules. In this example, line 1 from each of the four images is in registration with the first lenticule; line 2 from each of the four images is in registration with the second lenticule; etc. Each lenticule is associated with a plurality of image lines or an image line set, and the viewer sees only one image line of each set with each eye for each lenticule. It is imperative that the line image sets be registered accurately with respect to the lenticules, so that the proper picture is formed when the assembly is viewed.

Conventional recording of linear images on a lenticular recording material has been accomplished with a stereoscopic image recording apparatus that uses optical exposure. A light source, such as a halogen lamp, is projected through an original image, through a projection lens, and focused on lenticular material. The images are exposed on a receiver attached to the lenticular material as linear images. Japanese (Kokoku) Patent Applications Nos. 5473/1967, 6488/1973, 607/1974, and 33847/1978 disclose recording apparatus in which two original images are projected for printing on a lenticular recording material. Recording composite images in this fashion requires complex lens structures, which are expensive.

In contrast, image recording by scanning exposure requires comparatively simple optics, has great flexibility in adapting to various image processing operations, and to alterations in the dimension of the lenticules. To take advantage of these features, various apparatus and methods have been proposed for recording image by scanning exposure. For example, Japanese (Kokoku) Patent Application No. 3781/1984 teaches a stereoscopic image recording system in which a plurality of original images is taken with a TV camera, processed and stored in frame memories from which the stored image signals are retrieved sequentially as linear images in accordance with the pitch of lenticular lenses used. After the linear images are recorded on a recording material by scanning exposure, the lenticular sheet is bonded to the recording material. Another scanning method uses polygon scanners, described in U.S. Pat. No. 5,349,419, for exposure of photosensitive stereoscopic images directly on lenticular materials.

One of the problems associated with using polygon scanners for printing interdigitized images is the introduction of banding in the image. One cause of banding is due to differences in the reflectance for each facet of the polygon. One method to alleviate this problem is detailed in U.S. Pat. No. 5,248,997 which relates to using a lookup table to make the necessary corrections. This method, although effective, requires calibration and extra time to make the appropriate lookups of data from a table. Other causes of banding are slight differences in the polygon center-to-facet distance, and the lack of parallelism of each facet of the polygon to the spin axis.

SUMMARY OF THE INVENTION

It is an object of the present invention to provide a method for printing interdigitated images designed to be viewed through a lenticular or blocking line screen without banding in the individual images.

It is also an object of the present invention to provide a method for printing interdigitated images which compensates for center-to-center facet distance and lack of parallelism in polygon scanners.

The present invention is directed to overcoming one or more of the problems set forth above. Briefly summarized, according to one aspect of the invention, a method for printing interdigitated images comprises the steps of interdigitating f images by modulating b beams of light with image information. The b beams of light are scanned onto an image-forming medium by a polygon scanner which has p sides. The relationship between the number of images f, the beams of light b, and the number of sides of the polygon p is given by f/pb=n where n is an integer. The image-forming medium is registered with a lenticular medium.

When the method described above is used to write images, each image line is always written with the same facet of the polygon. This eliminates variation in intensity at the medium due to variations in facet-to-facet reflectance. This invention also tends to reduce visualization of errors due to slight differences in the polygon center to facet distance and the lack of parallelism of the facet to the spin axis.

The present invention provides a means of printing interdigitated images wherein banding within a viewed image is minimized. The reduction in banding is accomplished by moving variations due to facet defects to separate images, rather than distributing the defects across multiple images, thereby making the variations less noticeable.

The above, and other objects, advantages and novel features of the present invention will become more apparent from the accompanying detailed description thereof when considered in conjunction with the following drawings.

DETAILED DESCRIPTION OF THE INVENTION

The present description will be directed in particular to elements forming part of, or in cooperation more directly with, the apparatus in accordance with the present invention. It is to be understood that elements not specifically shown or described may take various forms well known to those skilled in the art.

Figure 1:
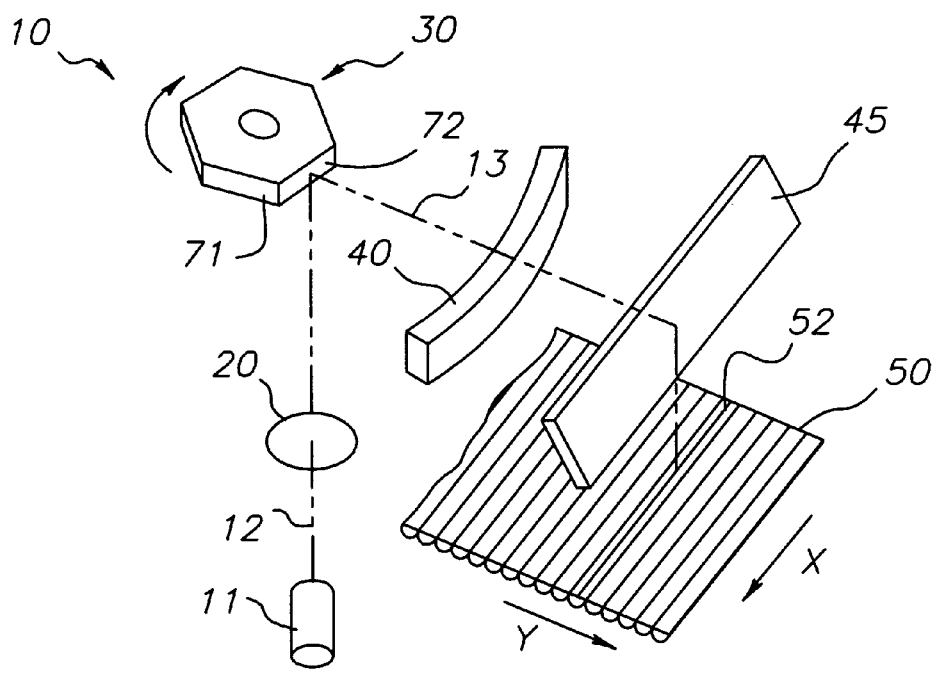
FIG. 1 is a perspective view of a polygon printer for interdigitated images.

Referring now to FIG. 1, a laser polygon printer referred to in general by numeral 10 is shown. Laser polygon printer 10 is comprised in general of laser 11, which may have one beam or multiple beams. For the sake of simplicity, one laser beam 12 is shown in FIG. 1. Beam shaping optics 20 focus the beam 12 on a facet of a spinning polygon 30.

The reflected beam 13 is then shaped using beam shaping optics 40. Beam shaping optics 40 may take several forms, including an f-θ lens or a cylinder lens, such that the focused beam forms a spot on photosensitive recording medium 50. Reflected beam 13 is deflected in a predetermined direction by means of a bend down mirror 45.

Each facet, for example, 72, of polygon 30 lays down one scanline 52 on the rear side of lenticular recording material 50. One line of one image is scanned across the medium 50. The medium 50 is advanced relative to the scanline 52 in a direction shown by arrow y, and another facet of the polygon 30 scans the writing beam across the medium 50 creating the next scanline. The process is repeated until one line from each original image has been scanned. At this point the medium has moved approximately one lenticule relative to the scanline. The image formed may be a color image or black and white.

Figure 2:
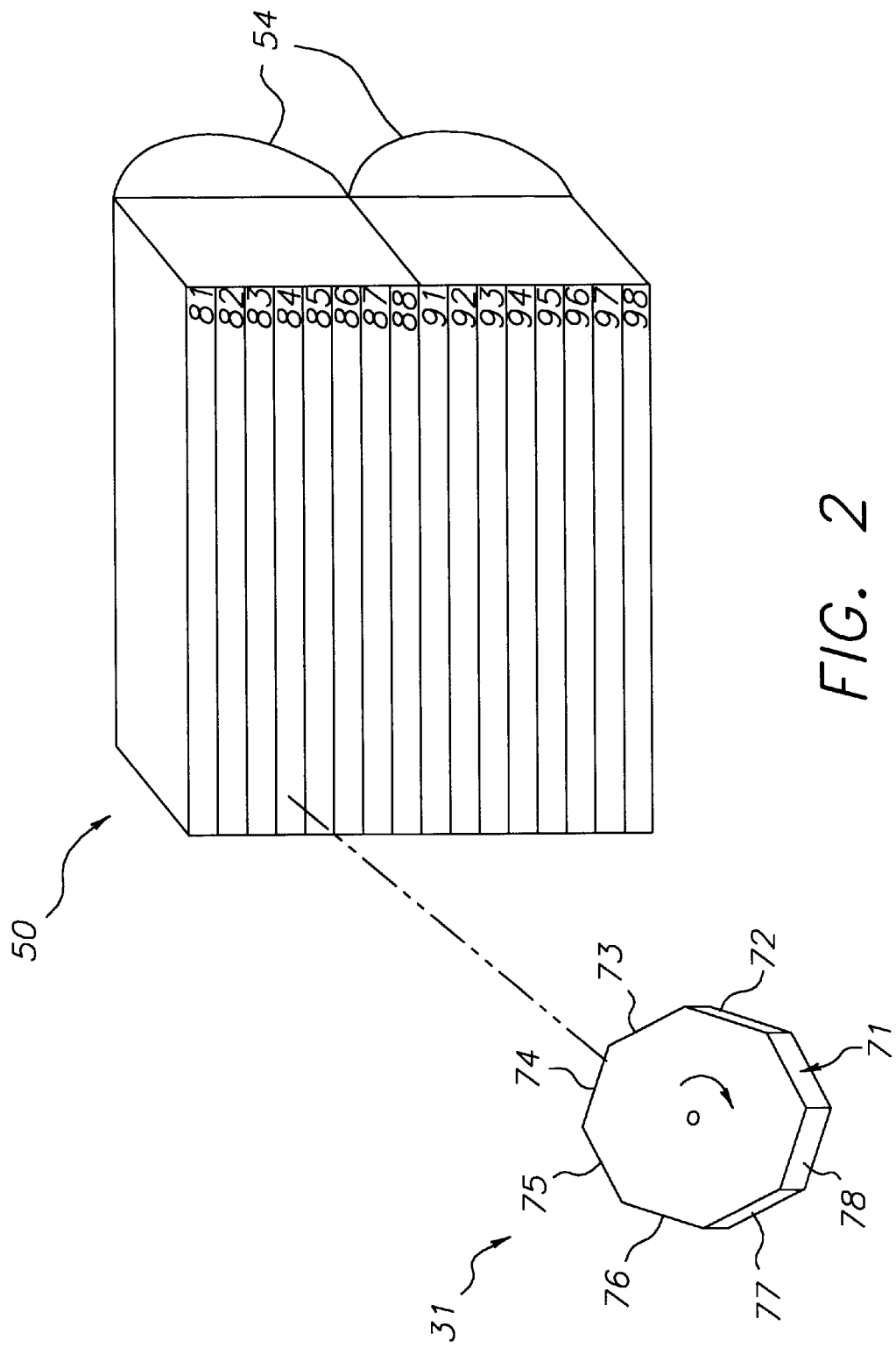
FIG. 2 is a schematic perspective view of a polygon printer for printing interdigitated images using an eight-sided polygon, one laser beam, and a composite image formed from eight separate original images.

This process is shown in more detail in FIG. 2. In this example, a composite image comprised of eight photographs is being scanned onto recording medium 50 by an eight-sided polygon 31. Facet 71 of polygon 31 lays down scanline 81 relating to a first original image. Facet 72 lays down scanline 82 from a second original image. This process is repeated with each facet laying down one line from each of the eight individual images until medium 50 has been advanced the width of one lenticule. The process is repeated with facet 71 laying down a second line from the first image as scanline 91, facet 72 laying down a second line of a second original image as scanline 92, and so forth until the media 50 has been advanced the width of another lenticule. Thus, each original image is laid down by only one facet of polygon 31.

In this example, the polygon was designed with a number of facets equal to the number of original images to be scanned into an interdigitated composite image. Thus, after one revolution has occurred, the start of the first scanline for the next lenticule is accomplished with the same facet as the first scanline for the first lenticule. As each line is scanned the medium is advanced relative to the scanning line.

The number of facets on the polygon is selected such that the desired number of images to be interdigitated is derived from the following formula:

$$f/pb=n$$

where:

f=number of images;

p=number of facets on the polygon;

b=number of writing beams; and n=an integer.

When this formula is used to select the proper number of images, polygon facets, and writing lines, banding is reduced because each image is always scanned with the same polygon facet.

Figure 3:
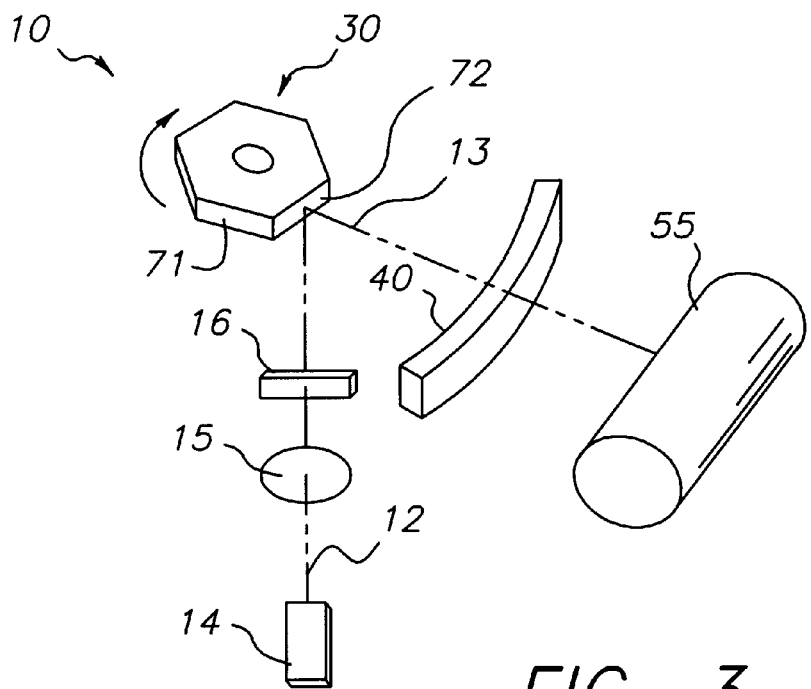
FIG. 3 is a perspective view of a polygon printer with a modulator for interdigitate images.

The laser beam 12, as shown in FIG. 1, may be modulated by turning laser 11 on and off as is well known in the art. As shown in FIG. 3, a plurality of laser beams 12 can be generated by laser array 14. In this embodiment, condensing optics 15 are used to focus the beams on modulator 16, which provides the imaging data to the multiple beams. Modulator 16 may also be before condensing optics 15, or between polygon 30 and drum 55.

Figure 4:
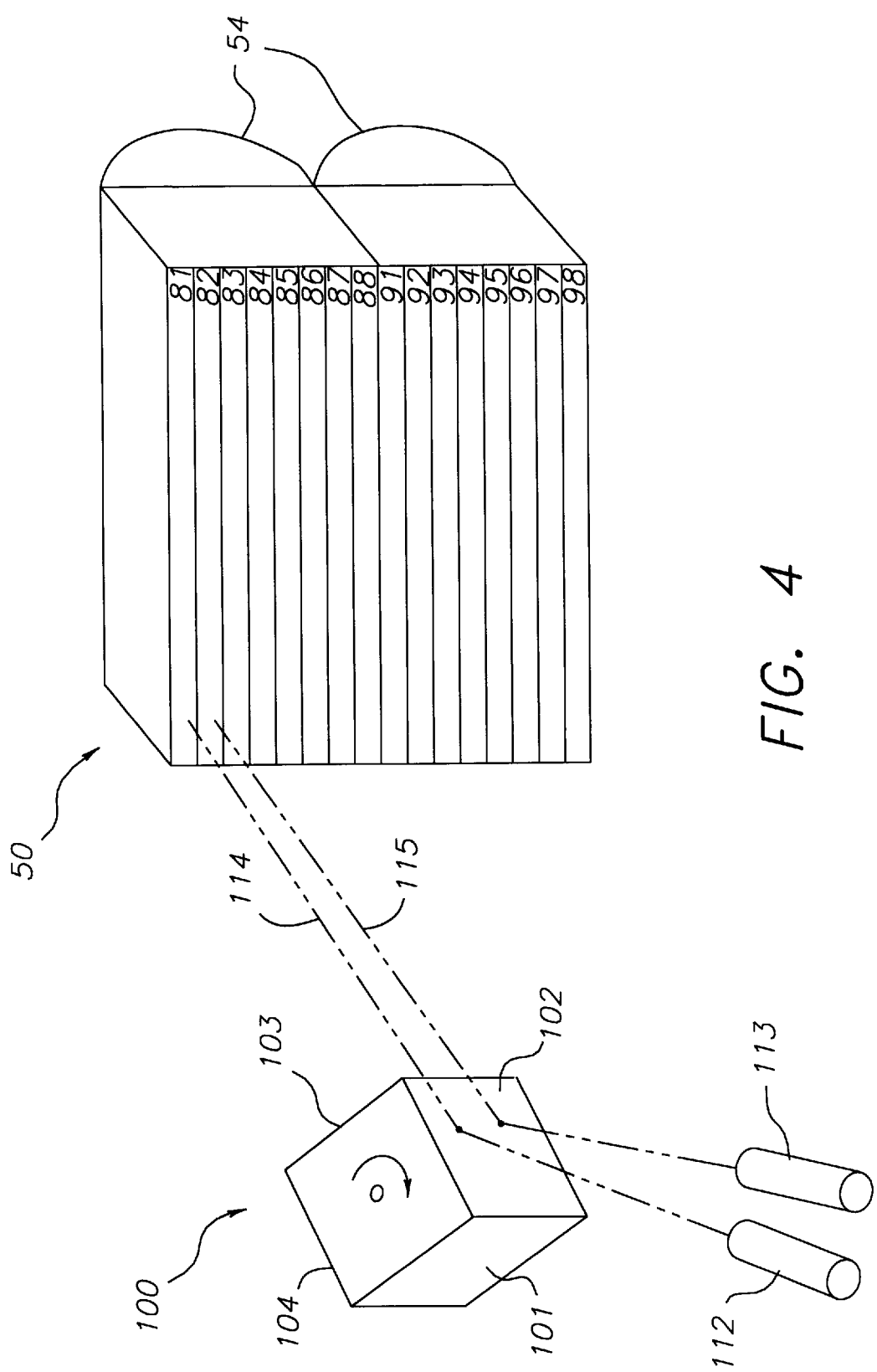
FIG. 4 is an enlarged view of two laser beams writing to a lenticular material.

FIG. 4 shows an embodiment of the invention using multiple laser beams. Lasers 112 and 113 are located one over the other. The beams are reflected from facets 101, 102, 103, or 104 of polygon 100 onto lenticular material 50. With multiple beams, reflected laser beam 114 writes line 81 and reflected beam 115 writes line 82. As polygon 100 is rotated bringing facet 103 into position, reflective beam 114 writes line 83, and reflected beam 115 writes line 84.

The invention has been described in detail with particular reference to certain preferred embodiments thereof, but it will be understood that variations and modifications can be effected within the spirit and scope of the invention. For example, the lenticular medium could be placed on a drum, on a flat platen, or even on a web feeder. In an additional embodiment the image forming media contains silver halide.

| PARTS LIST | |
| --- | --- |
| 10 | laser polygon printer |
| 11 | laser source |
| 12 | laser beam |
| 13 | reflected beam |
| 14 | laser array |
| 15 | condensing optics |
| 16 | modulator |
| 20 | beam shaping optics |
| 30 | polygon |
| 40 | beam shaping optics |
| 45 | bend down mirror |
| 50 | medium |
| 54 | lenticule |
| 55 | drum |
| 60 | translation mechanism |

-continued

| PARTS LIST | |
|---|---|
| 81 | line |
| 82 | line |
| 83 | line |
| 84 | line |
| 100 | polygon |
| 101 | facet |
| 102 | facet |
| 103 | facet |
| 104 | facet |
| 112 | laser |
| 113 | laser |
| 114 | reflective laser beam |
| 115 | reflected beam |

What is claimed is:

1. A method for printing interdigitated images comprising the steps of:

interdigitating f images;

modulating b light beams with image information;

scanning said b light beams onto an image-forming medium;

wherein said light beams are scanned with a polygon scanner wherein said polygon has p sides;

wherein $f/pb=n$ and wherein n is an integer; and registering said image-forming medium with a lenticular medium.

2. A method as in claim 1 wherein said image-forming medium forms at least two colors.

3. A method as in claim 1 wherein said image-forming medium contains silver halide.

4. A method as in claim 1 wherein said b light beams are scanned in b image lines and each of said b image lines are scanned sequentially.

5. A method as in claim 1 wherein said b light beams are comprised of multiple wavelengths.

6. A method for printing interdigitated images comprising the steps of:

interdigitating f images;

modulating b light beams with image information;

scanning said b light beams onto an image-forming medium in registration with a lenticular medium;

wherein said light beams are scanned with a polygon scanner wherein said polygon has p sides and $f/pb=n$ and wherein n is an integer.

7. A method for printing interdigitated images comprising the steps of:

interdigitating f images;

modulating b light beams with image information;

scanning said b light beams onto an image-forming medium in registration with a blocking line screen, wherein said light beams are scanned with a polygon scanner wherein said polygon has p sides and $f/pb=n$ and wherein n is an integer.

8. A laser polygon printer for printing interdigitated images comprising:

a laser producing b light beams;

a modulator for modulating said b beams of light with interdigitated image information;

a polygon for scanning said b light beams onto an image-forming medium, wherein said polygon has p sides and $f/pb=n$, wherein n is an integer and f is the number of images to be interdigitated.

9. A laser polygon printer as in claim 8 wherein said image-forming medium is registered with a lenticular medium.

10. A laser polygon printer as in claim 8 wherein said image-forming medium is registered with a line blocking screen.

11. A laser printer for printing interdigitated images comprising:

a laser producing a plurality of light beams;

a modulator for modulating said light beams with interdigitated image information;

wherein said interdigitated information is comprised of a plurality of original images;

a polygon having a plurality of facets for scanning said light beams onto an image-forming medium;

wherein each of said light beams containing interdigitated information related to a particular original image is scanned by the same facet of said polygon.

12. A laser polygon printer as in claim 11 wherein the number of facets on said polygon are equal to the number of said original images.

13. A laser printer for printing interdigitated images comprising:

a laser producing a plurality of light beams;

a modulator for modulating said light beams with interdigitated information;

wherein said interdigitated information is comprised of a plurality of original images;

a polygon having a plurality of facets for scanning said light beams onto an image-forming medium producing a plurality of scanlines wherein each of which scanlines is associated with one of each of said original images, and all scanlines associated with each of said original images are scanned with the same facet of said polygon.

* * * * *